US009126376B2

(12) United States Patent
Jessrang

(10) Patent No.: US 9,126,376 B2
(45) Date of Patent: Sep. 8, 2015

(54) METHOD AND A DEVICE FOR THE MANUFACTURE OF A FIBRE-REINFORCED THERMOPLASTIC COMPOSITE MODULE

(75) Inventor: Mathias Jessrang, Toulouse (FR)

(73) Assignee: Airbus Operations GmbH, Hamburg (DE)

( * ) Notice: Subject to any disclaimer, the term of this patent is extended or adjusted under 35 U.S.C. 154(b) by 317 days.

(21) Appl. No.: 13/638,989

(22) PCT Filed: Apr. 1, 2011

(86) PCT No.: PCT/EP2011/001663
§ 371 (c)(1),
(2), (4) Date: Oct. 31, 2012

(87) PCT Pub. No.: WO2011/120717
PCT Pub. Date: Oct. 6, 2011

(65) Prior Publication Data
US 2013/0048213 A1    Feb. 28, 2013

Related U.S. Application Data

(60) Provisional application No. 61/320,343, filed on Apr. 2, 2010.

(30) Foreign Application Priority Data

Apr. 2, 2010   (DE) .......................... 10 2010 013 713

(51) Int. Cl.
*B29C 65/18*   (2006.01)
*B29C 70/38*   (2006.01)
(Continued)

(52) U.S. Cl.
CPC ............... *B29C 70/386* (2013.01); *B29C 43/06* (2013.01); *B29C 65/18* (2013.01); *B29C 66/112* (2013.01); *B29C 66/131* (2013.01); *B29C 66/301* (2013.01); *B29C 66/3452* (2013.01); *B29C 66/532* (2013.01); *B29C 66/61* (2013.01); *B29C 66/721* (2013.01); *B29C 66/73921* (2013.01); *B29C 66/81422* (2013.01);
(Continued)

(58) Field of Classification Search
CPC ........ B29C 65/02; B29C 65/18; B29C 65/20; B29C 31/04; B29C 2043/3283; B29C 43/06; B29C 33/36
USPC .......................... 425/264, 331, 349, 353, 354; 156/309.6, 523, 574, 577
See application file for complete search history.

(56) References Cited

U.S. PATENT DOCUMENTS 4,273,567 A * 6/1981 Scholl et al. ...................... 65/72
6,613,258 B1 * 9/2003 Maison et al. ................ 264/102
(Continued)

OTHER PUBLICATIONS

International Preliminary Report on Patentability in PCT/EP2011/001663 mailed Oct. 11, 2012 and English translation.
(Continued)

*Primary Examiner* — Scott W Dodds
(74) *Attorney, Agent, or Firm* — Greer, Burns & Crain Ltd.

(57) ABSTRACT

A method for the manufacture of a fiber-reinforced thermoplastic composite module from a multiplicity of module components, which are continuously moved in the feed direction and are connected together section-by-section by means of a pressure application head that can be traversed in the feed direction and in the counter-direction. A device for the execution of the method is also disclosed.

7 Claims, 2 Drawing Sheets

(51) Int. Cl.
*B29C 43/06* (2006.01)
*B29C 65/32* (2006.01)
*B29C 65/00* (2006.01)
*B29L 31/00* (2006.01)
*B29L 31/30* (2006.01)

(52) U.S. Cl.
CPC .... *B29C 66/81423* (2013.01); *B29C 66/81431* (2013.01); *B29C 66/8242* (2013.01); *B29C 66/83541* (2013.01); *B29C 66/8432* (2013.01); *B29C 65/32* (2013.01); *B29C 66/0242* (2013.01); *B29C 66/0342* (2013.01); *B29L 2031/003* (2013.01); *B29L 2031/3082* (2013.01); *Y10T 156/10* (2015.01)

(56) References Cited

U.S. PATENT DOCUMENTS

| | | | |
|---|---|---|---|
| 7,282,107 B2 * | 10/2007 | Johnson et al. | 156/169 |
| 2007/0029038 A1 | 2/2007 | Brown et al. | |
| 2009/0211698 A1 | 8/2009 | McCowin | |
| 2010/0059169 A1 * | 3/2010 | Lengsfeld et al. | 156/199 |

OTHER PUBLICATIONS

International Search Report for PCT/EP2011/001663, mailed Jul. 19, 2011.
Written Opinion of the International Searching Authority for PCT/EP2011/001663, mailed Jul. 19, 2011.
German Search Report, Mar. 27, 2014.

* cited by examiner

METHOD AND A DEVICE FOR THE MANUFACTURE OF A FIBRE-REINFORCED THERMOPLASTIC COMPOSITE MODULE

CROSS-REFERENCES TO RELATED APPLICATIONS

This application is the U.S. national phase of International Application No. PCT/EP20011/001663, filed 1 Apr. 2011, which designated the U.S. and claims priority to DE Application No. 10 2010 013 713.8 filed 2 Apr. 2010, and claims the benefit to U.S. Provisional Application No. 61/320,343, filed 2 Apr. 20110, the entire contents of each of which are hereby incorporated by reference.

BACKGROUND OF THE INVENTION

The invention concerns a method for the manufacture of a fiber-reinforced thermoplastic composite module, for example, a shell element of an aircraft fuselage, and a device for the execution of the method.

Fiber-reinforced composite modules, such as shell elements of an aircraft fuselage, have in a manner of known art a backing structure formed from a multiplicity of longitudinal stiffeners, which are directly connected to a skin field, and a multiplicity of circumferential stiffeners, which are connected to the skin field via fittings, e.g., clips, and in addition are supported on the longitudinal stiffeners via supporting elements, e.g., cleats.

The manufacture of such fuselage segments is undertaken using either a differential form of construction or an integral form of construction. In the differential form of construction the individual components are produced separately from one another and are then assembled to form the complete module. What is particularly disadvantageous in this form of construction is the time- and cost-intensive assembly of the complete module. In addition the differential form of construction requires a multiplicity of connecting elements for purposes of connecting the module components together. The integral form of construction, in which the individual components are produced in an integral manner as a complete module, features a reduced assembly effort and, by virtue of the increase in the level of integration, a greater production effort. For purposes of reducing the production effort the patent U.S. Pat. No. 6,613,258 B1 proposes, for example, the manufacture of a fuselage barrel from fiber-reinforced thermoplastic composite materials. Here cured longitudinal stiffeners are laid in depressions of a cylindrical core. The core is then set in rotation about its longitudinal axis and a web-type laminate is wound onto the core. The laying down of the laminate is undertaken via a laying down head with the application of temperature and pressure, as a result of which the thermoplastic matrix is in a molten state and the laminate is welded securely to the longitudinal stiffeners. Disadvantageous in this solution, however, are the very tight production tolerances on the fuselage barrels.

SUMMARY OF THE INVENTION

The object of the present invention is to create a method for the manufacture of a fiber-reinforced thermoplastic composite module, which removes the above-cited disadvantages and forms an optimal compromise between the production effort, the assembly effort and the production tolerances, and also a device for the execution of this method.

In an inventive method for the manufacture of a fiber-reinforced thermoplastic composite module, which consists of a multiplicity of module components and is, for example, a shell element of an aircraft reinforced with stiffening elements, the module components are positioned relative to one another by means of a jig reproducing the geometry of the composite module. In accordance with the invention the module components are continuously moved in the feed direction and are connected to one another section-by-section by means of a pressure application head that can be traversed in the feed direction and in the counter-direction. The inventive method generates an optimal compromise between the assembly effort, the production effort and the production tolerances. While it is true that the shell mode of construction increases the production effort compared with the wound barrel mode of construction, the shell mode of construction allows for an improved tolerance compensation. The inventive solution brings together various technologies, such as the pressing and welding of thermoplastic modules, in a continuous production process for the manufacture of large modules. As a result of the continuous movement of the module components in the feed direction, and as a result of the ability of the pressure application head to traverse in the feed direction and in the counter-direction, the pressure application head can be embodied in a correspondingly compact manner. The size of the module is quasi-decoupled from the size of the pressure application head, so that any, or almost any, size of thermoplastic composite module can be manufactured using the inventive method.

In a preferred example of embodiment the pressure application head, for purposes of connecting the module components, is traversed out of a starting position in the feed direction of the module components, and after the connection of the module components, is then moved in the counter-direction. By this means the pressure application head is guided in a quasi-circle, which makes possible a relatively simple control system. The movement of the pressure application head in the feed direction and the counter-direction can be embodied in a particularly simple manner, if, after the pressure application head has been raised, it is moved back to the starting position.

In particular, the movement of the pressure application head in the feed direction is determined in accordance with its length in the feed direction. The pressure application head preferably has a length in the feed direction that is larger than a feed increment. This guarantees that during the pressure application process the pressed regions overlap, thus ensuring that the module components are welded or adhesively bonded to one another over the whole composite module.

In one example of embodiment at least one of the module components, for example a laminate for the manufacture of the skin field, is continuously laid down ahead of the pressure application process. By this means the storage of the respective module components is eliminated, so that long transit times as a result of transfer between various means of production are not necessary. Here it is advantageous if at least one module component is heated before the laying down process such that its thermoplastic matrix is in a molten state.

At least some of the module components are preferably laid down on the tool mold in the solidified state (thermoplastics do not "cure" in the same way as thermosetting plastics). In particular this eases the handling of the module components and their positioning on the tool mold.

To achieve a defined polymer structure it is advantageous if the module components are cooled in a controlled manner while they are being connected by the pressure application head.

An inventive device for the manufacture of a fiber-reinforced thermoplastic composite module has a tool mold for purposes of positioning individual module components relative to one another; this can be moved in a feed direction; the device also has a pressure application head that can be traversed in the feed direction and in the counter-direction for purposes of welding the module components. The inventive device enables the continuous production of large modules, such as shell elements for an aircraft fuselage, for example, which are reinforced by means of a backing structure. At the same time the device can be embodied in a very compact manner, since the pressure application head, by virtue of its ability to traverse in the feed direction and in the counter-direction, need not extend over the total length of the tool mold in the feed direction. The inventive device enables the movement of the pressure application head in a quasi-circular path, so that the pressure application head itself only has to be a fraction of the length of the tool mold in the longitudinal direction. At the same time the compactness of the pressure application head can be increased further if this can also be moved in the transverse direction.

For purposes of achieving a high level of consolidation it is advantageous if at least one heating device, or example an induction welding device, is arranged in each case in the tool mold region in which the module components are to be accommodated.

Other advantageous examples of embodiment of the present invention are the subject of further subsidiary claims.

BRIEF DESCRIPTION OF THE DRAWINGS

In what follows preferred examples of embodiment of the present invention are elucidated in more detail with the aid of schematic representations. Here.

In the figures the same constructive elements bear the same reference numbers, wherein in the interests of clarity in the case of a plurality of the same constructive elements in one figure only one element is provided with a reference number.

DETAILED DESCRIPTION OF THE PREFERRED EMBODIMENTS

Figure 1:
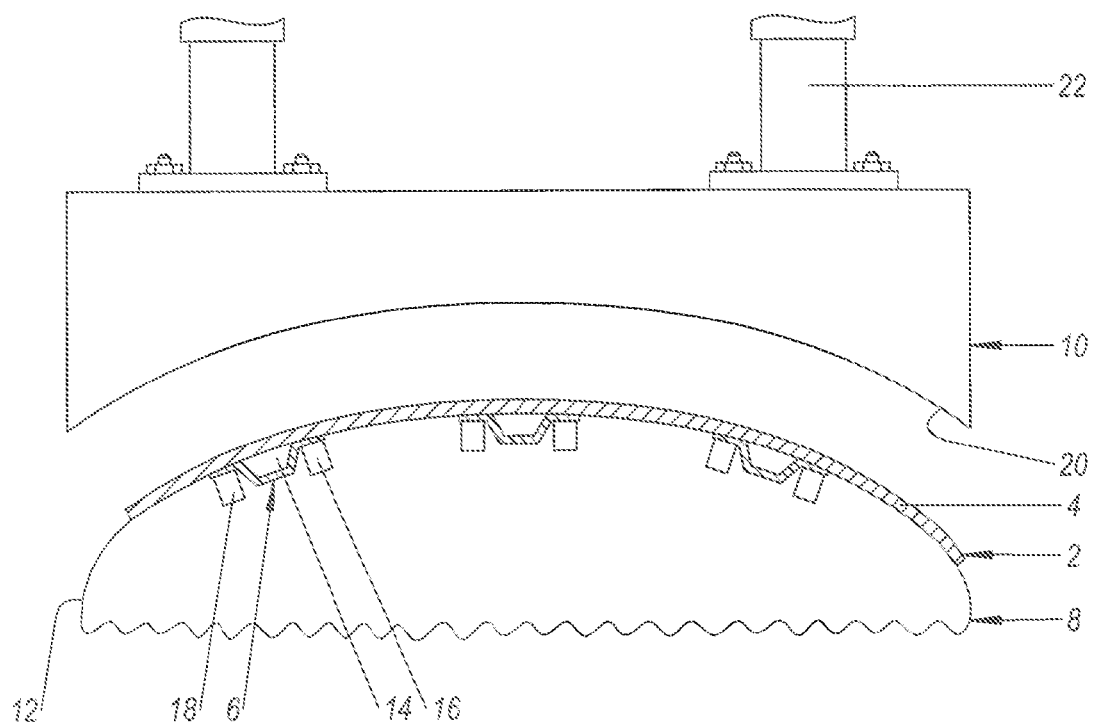
FIG. 1 shows a cross-section through an inventive device.

FIG. 1 shows an inventive device for the manufacture of a fiber-reinforced shell element 2, reinforced, for example with carbon fibers, on a thermoplastic base for the manufacture of an aircraft fuselage. The shell element 2 consists of a fiber-reinforced thermoplastic skin field 4 and a multiplicity of integral fiber-reinforced thermoplastic longitudinal stiffeners 6 for purposes of reinforcing the skin field 4. Further stiffeners, such as circumferential stiffeners, are not represented in the interests of clarity. These can similarly be designed integrally with the skin field 4, or can be connected subsequently.

The device 1 has a lower tool mold 8 and an upper pressure application head 10. The tool mold 8 can be traversed in the longitudinal direction and has a concave surface 12 corresponding to the geometry of the aircraft fuselage for purposes of laying down laminate layers to form the skin field 4, in which a multiplicity of depressions 14 extending in the longitudinal direction of the tool mold 8 are designed for purposes of accommodating the longitudinal stiffeners 6. In the example of embodiment shown the longitudinal stiffeners 6 are designed as omega profiles; these are welded or adhesively bonded to the skin field 4 in the region of their foot sections 16. For purposes of achieving a high level of consolidation the foot sections 16 are supported in each case on a heating device 18, for example an induction welding device, arranged in the region of the depressions 14.

The pressure application head 10 has a convex counter-surface 20 shaped in a complementary manner to the tool mold 8; this extends essentially over the whole width of the surface 12, so that the skin field 4 in one pressure application can be fully clamped in the transverse direction between the pressure application head 10 and the tool mold 8. It can be traversed via at least one cylindrical ram arrangement 22 orthogonally to the tool mold 8. In addition the pressure application head 10 can be traversed in the feed direction and in the counter-direction of the tool mold 8. For purposes of achieving controlled cooling the pressure application head 10 has a heating device, not shown, for example an induction heating device.

Figure 2:
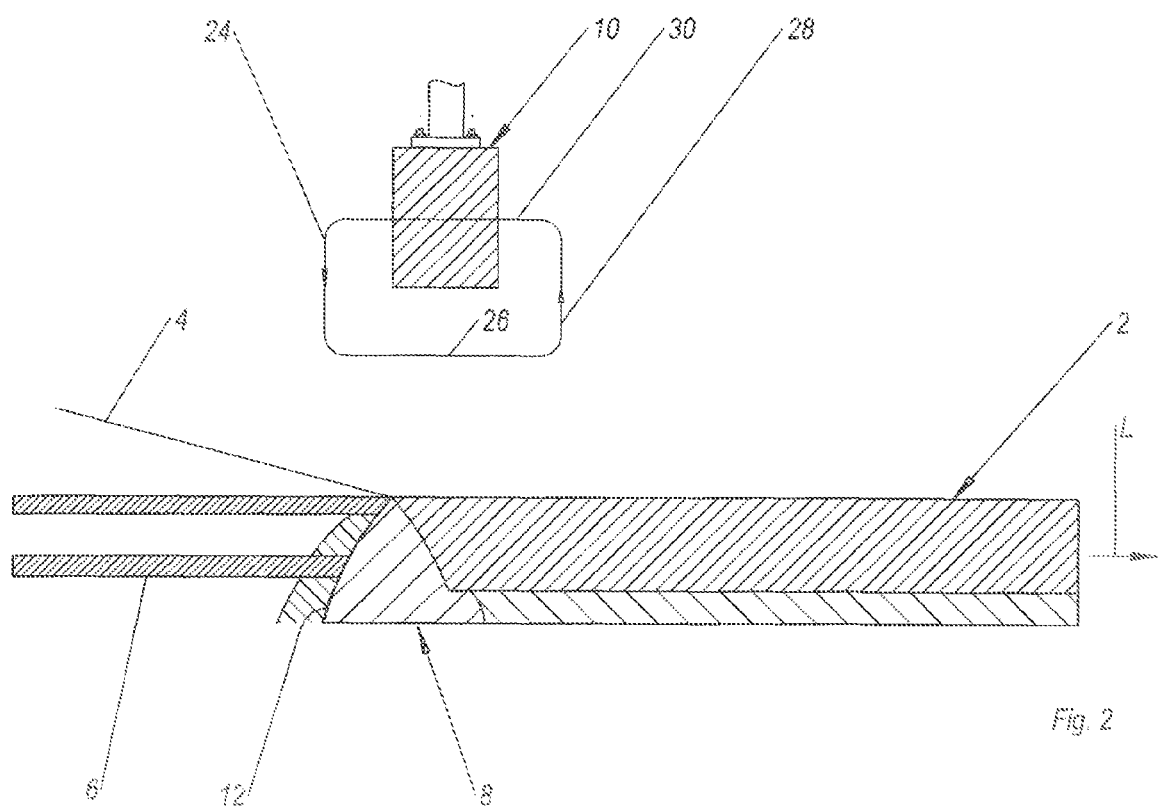
FIG. 2 shows an inventive method.

In what follows an inventive method for the manufacture of a shell element 2 for an aircraft fuselage, i.e., for the activation of the device 1, is described with the aid of FIG. 2. Firstly the fully or partly consolidated fiber-reinforced thermoplastic longitudinal stiffeners 6 are positioned in the depressions 14 of the tool mold 8. The fiber-reinforced thermoplastic laminate is then continuously supplied onto the surface 12 to form the skin field 4, and thus over the foot sections 16 of the longitudinal stiffeners 6. The laminate layers have previously been heated in a furnace, not represented, such that their thermoplastic matrix possesses a viscosity that is suitable for the pressure molding process during the laying down process on the tool mold 8. The pressure application head is heated to a temperature matched to the desired material properties of the thermoplastics, and from its starting position executes a lowering movement 24 in the direction of the laid down molten laminate layers, so that the latter, by means of the application of pressure and temperature, are welded to the foot sections 16 of the longitudinal stiffeners 6 and moreover are laid down on the surface 12 such that they conform to its contour and there solidify. At the same time at least the contact points of the skin field 4 and the longitudinal stiffeners 6 that are to be welded are heated in a controlled manner via the induction welding devices 18 in order to promote the welding process. The tool mold 8 and the pressure application head 10 are then moved in the longitudinal direction L, i.e., the feed direction 26, with the same velocity, so that the relative velocity between the tool mold 8 and the pressure application head 10 moving in the same direction is equal to zero. After a defined pressure application time the pressure application head 10 is activated such that it executes a raising movement 28 in the direction away from the tool mold 8. The tool mold 8 continues to execute a continuous feed movement in the longitudinal direction L. After the raising of the pressure application head 10 this is guided back to its starting position via a movement 30 in the counter-direction. After it has arrived at its starting position the pressure application head has described a quasi-circular movement, which is repeated until the skin field 4 is welded to the longitudinal stiffeners 6 over its whole length. At the same time the pressure application head 10 during the counter-movement 30 is advanced by the same amount as during the feed movement 26. However, the movement of the pressure application head 10 in the feed direction 26 corresponds to a fraction of the length of its body in the feed direction 26, so that with each circular movement regions of overlap are formed between the pressure application head 10 and the skin field 4, and at least small regions, if not each skin field section, are twice subjected to temperature and pressure. After the welding of the skin field 4 to the longitudinal stiffeners 6 the shell element 2 is extracted from the tool mold 8, i.e., the required skin field length is detached from the skin field section that is continuously exiting the press, and is fed through to any further mechanical processes for the smoothing of module edges, the introduction of window apertures, door apertures, and similar.

Disclosed is a method for the manufacture of a fiber-reinforced thermoplastic composite module from a multiplicity of module components, which are continuously moved in the feed direction and are connected together by sections by means of a pressure application head that can be traversed in the feed direction and in the counter-direction; also disclosed is a device for the execution of the method.

REFERENCE SYMBOL LIST

1 Device
2 Shell element
4 Skin field
6 Longitudinal stiffener
8 Tool mold
10 Pressure application head
12 Concave surface
14 Depression
16 Foot section
18 Heating device
20 Convex counter-surface
22 Cylindrical ram arrangement
24 Lowering movement
26 Movement in the feed direction
28 Raising movement
30 Counter-movement in the counter-direction
L Longitudinal direction/feed direction

The invention claimed is:

1. A method for the manufacture of a fiber-reinforced thermoplastic composite module, from a multiplicity of module components, comprising the steps:

positioning the module components relative to one another on a tool mold reproducing a geometry of the composite module, continuously moving the module components and the tool mold in a feed direction and connecting the module components to one another section-by-section via a pressure application head which is raised and lowered relative to the tool mold as well as traversed in sectioned direction at the same speed as the tool mold for a feed increment distance and traversed in an opposite direction as the tool mold feed direction for a second distance at least once for each section.

2. The method in accordance with claim 1, wherein the pressure application head is moved back to the starting position.

3. The method in accordance with claim 1, wherein the pressure application head has a length in the feed direction that is greater than the feed increment distance.

4. The method in accordance with claim 1, wherein at least one of the module components is continuously laid down on the tool mold.

5. The method in accordance with claim 4, wherein the at least one module component is heated before it is laid down on the tool mold.

6. The method in accordance with claim 1, wherein at least one of the module components is supplied to the tool mold in a solidified state.

7. The method in accordance with claim 1, wherein during the connection of the module components by means of the pressure application head the module components are cooled in a controlled manner.

* * * * *